United States Patent [19]

Ferguson et al.

[11] Patent Number: 5,065,058
[45] Date of Patent: Nov. 12, 1991

[54] SHROUD FOR DYNAMOELECTRIC MACHINE

[75] Inventors: James H. Ferguson; Duncan T. Bath, both of Peterborough, Canada

[73] Assignee: General Electric Canada Inc., Missisauga, Canada

[21] Appl. No.: 697,743

[22] Filed: May 6, 1991

Related U.S. Application Data

[63] Continuation of Ser. No. 431,799, Nov. 6, 1989, abandoned.

[30] Foreign Application Priority Data

Dec. 22, 1988 [CA] Canada ................................. 586760

[51] Int. Cl.$^5$ .......................... H02K 9/04; H02K 9/00
[52] U.S. Cl. ........................................ 310/62; 310/52; 310/58; 310/59
[58] Field of Search ..................... 310/52, 55, 56, 57, 310/58, 59, 60 A, 60 R, 61, 62, 64, 65, 157

[56] References Cited

U.S. PATENT DOCUMENTS

| | | | |
|---|---|---|---|
| 3,558,557 | 6/1971 | Kilgore et al. | 310/60 |
| 4,182,966 | 1/1980 | Mishra et al. | 310/59 |
| 4,233,533 | 11/1980 | Lown | 310/59 |

FOREIGN PATENT DOCUMENTS

| | | | |
|---|---|---|---|
| 1238933 | 7/1988 | Canada . | |
| 0108945 | 6/1983 | Japan | 310/58 |

Primary Examiner—Steven L. Stephan
Assistant Examiner—Clayton E. LaBalle

[57] ABSTRACT

A ventilation cooling system for a dynamoelectric machine is disclosed, which provides improved cooling efficiency and reduction in windage loss. A first stream of cooling gas is directed into the spider of the machine and transversely through ventilation ducts in the rotor, across the gap, then through corresponding ducts in the stator. A further stream of cooling gas is drawn in between the spider and a shroud which extends inwardly transversely from the stator. This further stream is directed downwardly between the poles of the rotor and then transversely through the gap and stator in conjunction with the first stream.

4 Claims, 1 Drawing Sheet

SHROUD FOR DYNAMOELECTRIC MACHINE

This application is a continuation of application Ser. No. 431,799, filed Nov. 6, 1989 now abandoned.

This invention relates to a cooling system for a dynamoelectric machine. More particularly, it relates to a ventilation cooling system for the rotor and stator components of a dynamoelectric machine having improved reduction in windage loss and improved cooling efficiency.

BACKGROUND OF THE INVENTION

Due to the considerable amount of heat generated during operation of the dynamoelectric machine, efficient cooling of the rotor and stator components is required. The design of an efficient cooling system is particularly acute in large scale hydroelectric units having a capacity of 20 MVA or higher. Past attempts at providing efficient cooling of such machines met with varying degrees of success. These attempts involved the use of cooling gases such as air in conjunction with water cooling or involved a two component gas ventilation system using separate cooling circuits for the rotor and stator components respectively.

In U.S. Pat. No. 3,588,557 of Kilgore et al issued June 28, 1971, the ventilation system included a shroud that extends onto the rotor spider from the stator frame to define an air inlet. Air is drawn down between the rotor poles and the air gap between the rotor and stator. The heated air is then directed through a heat exchanger for cooling and recirculation. This system does not provide transverse cooling through the rotor windings. It also requires a separate cooling system for the stator.

In U.S. Pat. No. 4,182,966 of Mishra et al issued Jan. 8, 1980, a system is disclosed for cooling the stator components only. Air is drawn in to a passage between the stator shroud and rotor spider. An air stream passes over the end windings of the stator and through coolers, after which it travels in an inward direction through the stator windings. This stream is passed through longitudinal ducts in the stator which are sealed off from the rotor and the gap, to provide cooling of the stator independent of contamination from heated air discharging across the gap. While this provides an improved stator cooling, a separate cooling systems is needed for the rotor.

In U.S. Pat. No. 4,233,533 of Lown issued Nov. 11, 1980, a system is disclosed wherein air enters through the rotor spider structure and is directed transversely through ventilation ducts in the rim of the rotor to remove heat from the rotor field windings and poles. This air continues through the gap between the rotor and stator ventilation ducts in order to remove heat from these components as well. Since the cooling air collects heat from the rotor before it reaches the stator ducts, it is difficult to provide efficient cooling of the stator in large dynamoelectric machines. Large volumes of air must pass through the system. This is done by means of directional vanes that provide a tangential velocity to the air and reduce windage loss.

In Canadian Patent No. 1,238,988 issued July 5, 1988 filed in the name of the present applicant, a further attempt is made to provide efficient cooling with reduced windage loss. Turning vanes direct air into the rotor in the direction of rotation and a second set of vanes direct the air from the rotor in reverse direction for recirculation. A second stream is provided axially along the gap and through the stator windings. While this provides more efficient reduction of windage loss than the prior art, the system calls for separate cooling streams for the stator and the rotor.

SUMMARY OF THE INVENTION

The present invention provides for an improved cooling system wherein a stream of cooling gas in directed transversely through the rotor windings between the poles and then through the air gap and subsequently through the stator core. A second stream is drawn in between the shroud and rotor spider at both ends of the rotor and then directed axially between the rotor poles. The two streams combine in the air gap and flow through the stator core so that the stator is cooled by the combination of the first stream which was drawn transversely through the rotor and the second stream which was drawn axially between the rotor poles.

While the use of a guided air passage such as provided by a shroud over the ends of a machine is known, the design had never been appropriate for large machines with their requirement of both high efficiency and intensive cooling. One arrangement used a shroud, the open end of which was spaced a considerable axial distance from the end of the rotor. These shrouds permitted only modest pumping capability to circulate the cooling air and resulted in high windage losses due to the large areas available for recirculation.

In another arrangement, the shroud was secured to the stator frame and extended inward over the end winding and projected axially before extending radially over the rotor. The space between the shroud and the rotor provided a controlled inlet passage for cooling air, and such air was then passed both radially through the end windings and axially between the poles. This arrangement provided reduced windage losses, but there was poor cooling of the end windings due to the small amount of cooling air that was available for cooling such a large area.

Another attempt to overcome this windage loss problem was the design of a machine with a cooperating ridge on the spider of the rotor which reduces the gap to form an effective seal between the stationary shroud and the rotor. While this provided some reduction in windage loss, an unsatisfactory degree of leakage continued through the seal due to the large diameter of these machines. Also, the more intensive cooling used on modern machines has increased static pressure inside the shrouds and compounded the seal leakage problem.

In modern high speed hydroelectric machines, it is important to reduce windage loss to an even greater extent without reducing cooling efficiency. By securing the shroud at the edge of the stator immediately adjacent the gap, the end windings are excluded from the shroud passage. Then, by extending the shroud radially inwardly over the rotor spider, as is done in the present invention, the incoming cooling gas is drawn in by the fan action of the rotating spider. This fan action creates a positive pressure that both reduces leakage and creates a positive incoming flow of cooling air. This effectively overcomes any serious problem of leakage through the seal. In the machine of the present invention, these end windings are cooled by the return flow of recycled gas from the cooler in a manner to be described below.

It is therefore an object of this invention to provide a dynamoelectric machine having an improved cooling system for the rotor and stator components.

It is another object of this invention to provide an air cooled dynamoelectric machine having reduced windage loss.

These and other object of this invention are provided by a dynamoelectric machine comprising:

a) a stator member having windings thereon and end windings extending from the upper and the lower ends thereof, said stator member having stator ducts extending therethrough in a generally radial direction, b) a rotor member concentrically mounted within said stator member and axially rotatable therewithin to define a gap therebetween, c) a spider on said rotor member having upper and lower walls supporting a rim, a plurality of poles saliently positioned on said rim and ventilation ducts spaced therebetween to define radial gas passages to said gap and to cooperating gas passages in said stator ducts, d) means for admitting a first stream of cooling gas into said spider and directing said stream transversely through said ventilation ducts, gap and stator ducts, e) a shroud means mounted at the upper edge and the lower edge of said stator member between said gap and said end windings, said shroud means extending transversely therefrom over each of the respective upper and lower walls of said spider to define a gas inlet therebetween, f) means for directing a further stream of upper cooling gas into each said gas inlet for passage axially between said poles of said rotor and then transversely through said gap and said stator ducts in conjunction with said first stream.

BRIEF DESCRIPTION OF THE DRAWINGS

The single figure of drawings is a radial cross-section in partially schematic form of a dynamoelectric machine illustrating the embodiments of the present invention.

DETAILED DESCRIPTION OF A PREFERRED EMBODIMENT

Figure 1:
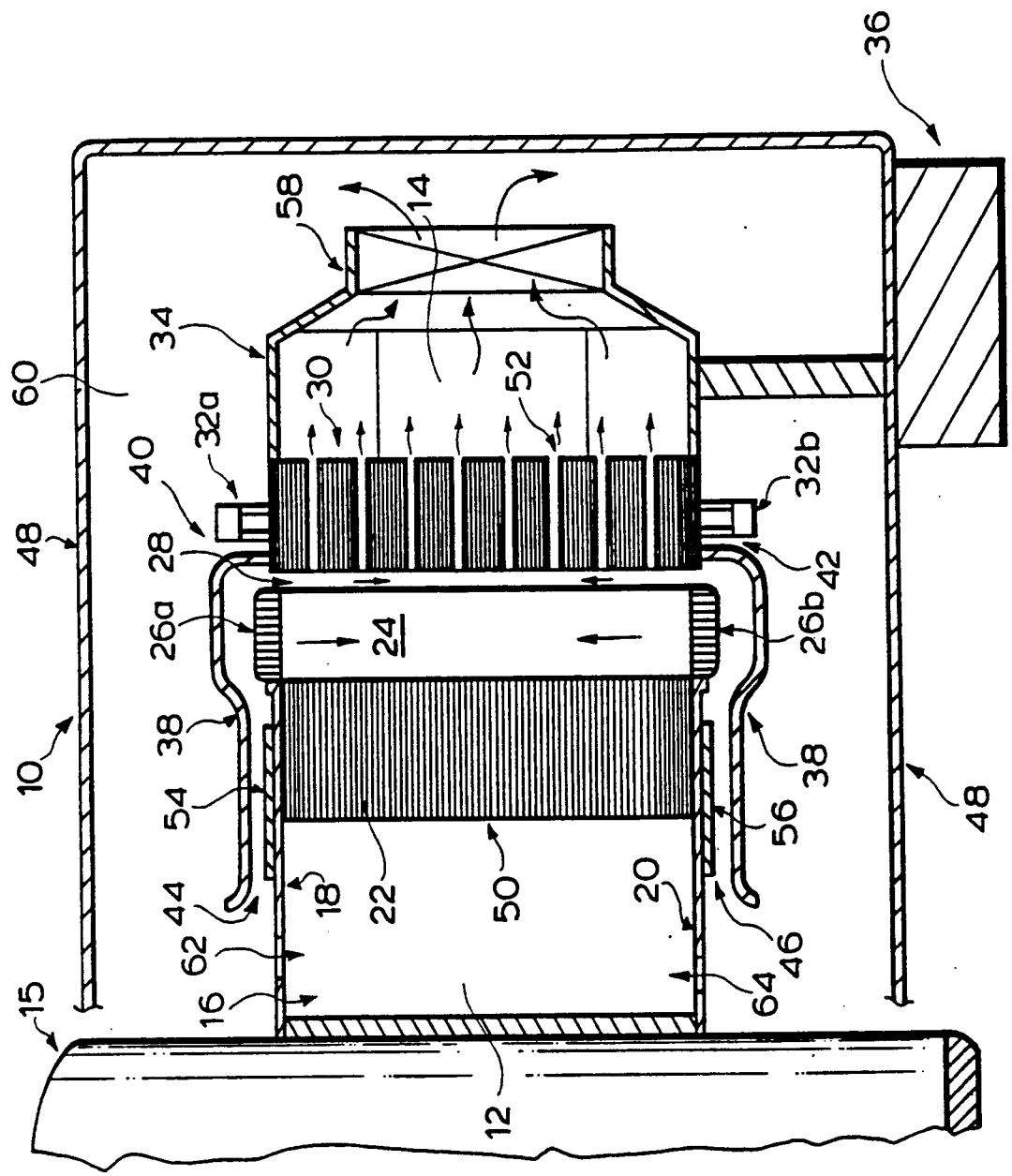

The dynamoelectric machine shown generally at 10 comprises a rotor 12 and a stator structure 14. The rotor 12 is rotatable within stator 14 around a bearing supported or guided by a shaft shown schematically in partially broken section at 15 and driven by means of waterpower or other energy in a manner well known in the art. A spider member 16 on rotor 12 includes an upper wall 18 and a lower wall 20 for supporting the circumferential rotor rim 22 in axial extension from it's center of rotation.

A series of axially aligned pole members 24 are saliently position around rim 22. Rotor coils, the upper and lower portion of which is shown at 26a and 26b respectively are circumferentially positioned as part of the pole members 24.

A gap 28 separates the circumferential extension of rotor 12 from stator structure 14 and permits free rotation of the rotor therewithin. Stator structure 14 includes the stator core 30 having windings thereon, the upper and lower extension thereof is shown at 32a and 32b. Stator core 30 is mounted on stator frame 34. A shroud member 38 forms a seal against the stator core 30 at upper end 40 and lower end 42. These seals or shroud mountings are at the edge of the stator core adjacent the gap or at least at a location radially inward of the end windings. The portion of shroud 38 extends inwardly over upper wall 18 of spider member 16 to define a cooling gas inlet passage 44 therebetween. Similarly, the lower portion of shroud 38 extends inwardly around the underportion of spider member 16 to define a cooling gas inlet passage 46 between shroud 38 and lower wall 20. The dynamoelectric machine and its wall enclosure are anchored to a base in a manner well known in the art and is shown schematically at 36.

A wall 48 encloses the dynamoelectric machine. A gas chamber 60 is defined within the space between the rotor and stator assembly and the wall 48. It must be appreciated that only one radial cross-section of half of the machine is shown in the drawing. A full cross-section would show the wall extending around the portion of the machine located on the other side of guide shaft 15.

The inclusion of more than one cooler 58 in the machine is an optional feature. Cooled gas from cooler 58 is discharged into the encircling chamber 60 in the direction indicated by the arrows. One stream is passed back over end windings 32a for the cooling thereof and subsequently into opening 62 in upper wall 18 of spider member 16. The machine may include a number of baffles (not shown) for directing the recirculating stream over and through end windings 32a. Rotation of rotor 12 directs this incoming stream radially toward ventilation ducts 50 in rotor rim 22, whereupon the cooling gas passes through ducts 50 to cool rotor coils 26 and gap 28. A further stream of the gas at the upper end of chamber 60 is directed into upper inlet passage 44. This further stream is drawn into the passage of shroud member 38 by fan blades 54, then passes over coil 26a and the ends of pole members 24 where it continues down between the pole members and gap 28 as indicated by the directional arrow.

Similarly, a stream of the gas at the lower end of chamber 60 is passed back over end windings 32b for the cooling thereof and subsequently into opening 64 in lower wall 20 of spider member 16. This stream is also directed toward ventilation ducts 50 for rotor cooling. A further stream is directed toward lower inlet passage 46 where it is drawn in by fan blades 56 and passed over coil 26b and the end of pole member 24. This further stream continues up between the pole members and gap 28 in the direction indicated by the arrow.

The comparatively large volume of gas passing through rotor ventilation ducts 50 carries along the axially directed further streams of gas which merge with it in gap 28 to pass through stator ducts 52. The combined first streams and further streams continue through passages in stator frame 34 and into cooler 58 where heat is withdrawn. This cooled gas can then be re-circulated into chamber 60 where optionally, it may be enhanced by additional cooling gas from another source (not shown).

It was found that for most efficient cooling, the openings 62 and 64 in spider 16 should be large enough in comparison to the passages 44 and 46 in shroud member 38 so that approximately 60% to 80% by volume of the cooling gas entering the machine is directed into the spider.

Certain preferred embodiments of the invention have been described in detail. From a reading of this disclosure, obvious modifications will be evident to those skilled in the art without departing from the spirit of the invention disclosed or from the scope of the appended claims.

What we claim as new and desire to secure by Letters Patent of the United States is:

1. A dynamoelectric machine comprising:
   (a) a stator member having an upper end and a lower end and having windings therein and end windings extending from the upper and lower ends thereof, said stator member having stator ducts extending therethrough in a generally radial direction,
   (b) a rotor member concentrically mounted within said stator member and axially rotatable therewithin to define an air gap,
   (c) a spider on said rotor member having upper and lower walls supporting a rim, a plurality of poles saliently positioned on said rim and ventilation ducts spaced therebetween to define radial gas passages to said gap and to cooperating gas passages in said stator ducts,
   (d) means for admitting a first stream of cooling gas to said spider and directing said stream transversely through said ventilation ducts, gap and stator ducts,
   (e) a shroud means mounted at the upper end and the lower end of said stator member between said gap and said end windings, said shroud means extending transversely therefrom over each of the respective upper and lower walls of said spider to define a gas inlet passage therebetween, and
   (f) directional blades on said upper and lower walls of said spider positioned within each respective gas inlet passage for drawing a second stream of gas radially outward through the gas inlet passage for passage axially between said poles of said rotor and then transversely through said gap and said stator ducts in conjunction with said first stream.

2. A dynamoelectric machine as claimed in claim 1 which includes a cooling means downstream of said stator ducts for withdrawing heat from said streams of cooling gas for recirculation in said machine.

3. A dynamoelectric machine as claimed in claim 2 which includes a recirculation means downstream of said cooling means for directing said gas into said spider and each said gas inlet passage.

4. A dynamoelectric machine as claimed in claim 2 having an enveloping wall defining a gas chamber around said machine for the recirculation of said gas from said cooling means to said spider and each said gas inlet passage.

* * * * *